R. L. FORD.
FERTILIZER DROPPER.
APPLICATION FILED AUG. 29, 1914.

1,237,629. Patented Aug. 21, 1917.

Witnesses:
F. W. Hoffmaster.
C. C. Palmer.

Inventor:
Ralph L. Ford,
By Chas. E. Lord
Atty.

UNITED STATES PATENT OFFICE.

RALPH L. FORD, OF CHICAGO, ILLINOIS, ASSIGNOR TO INTERNATIONAL HARVESTER CORPORATION, A CORPORATION OF NEW JERSEY.

FERTILIZER-DROPPER.

1,237,629.   Specification of Letters Patent.   Patented Aug. 21, 1917.

Application filed August 29, 1914. Serial No. 859,144.

*To all whom it may concern:*

Be it known that I, RALPH L. FORD, a citizen of the United States, residing at Chicago, in the county of Cook and State of Illinois, have invented certain new and useful Improvements in Fertilizer-Droppers, of which the following is a full, clear, and exact specification.

My invention relates to fertilizer droppers particularly adapted for use in connection with seed planters.

It is the object of my present invention to simplify and improve the operation and construction of such devices.

As is well known, fertilizer droppers when employed on corn planters usually occupy a position well above the frame of the machine, it being necessary to so locate them that they will clear the carrying wheels. Owing to this elevation of the hoppers it becomes a very difficult task to fill them when in position on the machine, and my invention contemplates the employment of means whereby the hopper and its base portion carrying the dropper plate may be quickly detached from the supporting member and readily removed to a position on the ground where the hopper may be filled.

It is also well known that commercial fertilizer, such as is used in devices of this class, is adhesive in its nature, and when dampened clings tenaciously to the sides of the hopper and to the dropper plate, thereby clogging the mechanism. To combat this I have provided means whereby the base plate, including the dropper plate, may be quickly detached from the hopper for the purpose of cleaning. Another obstacle to be overcome in the handling of fertilizer is that when it is allowed to stand in the hopper for any considerable length of time it will become caked, and this happens in many cases where a partly filled can of fertilizer is permitted to stand over night. To prevent this I have made all parts of the hopper, dropper plate, etc., quickly detachable so that an operator may, when he has finished the day's planting, without any great expenditure of time or trouble thoroughly clean all parts of the device on account of their accessibility. Moreover, it is desirable in fertilizer droppers that a large opening be provided for the discharge of fertilizer on account of the viscous nature of the material being handled. This, however, has not been possible heretofore on account of the speed at which the dropper plate has been driven, wherewith to provide a large opening would mean an excessive discharge of fertilizer. By an improved driving mechanism for the dropper plate whereby a slow speed can be attained I am enabled to utilize the advantages of large cells or discharge openings.

One form of my invention is exemplified in the following description and illustrated in the accompanying drawings, in which—

Figure 1:
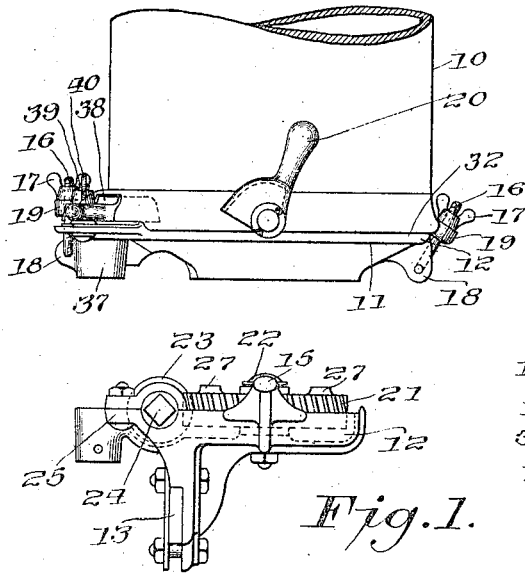
Figure 1 shows a detail view of the hopper and associated parts in elevation, the hopper and base plate being shown detached from the supporting member and the driving means.
Figure 2:
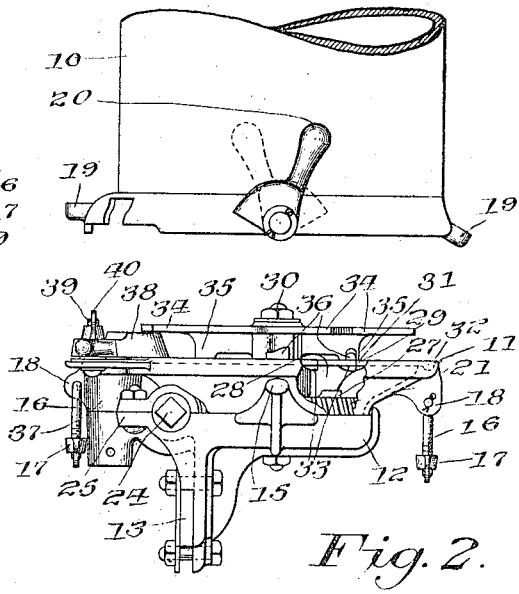
Fig. 2 shows a similar view of the different parts, except that the hopper is detached from its base plate, the latter being in position upon the supporting member.
Figure 3:
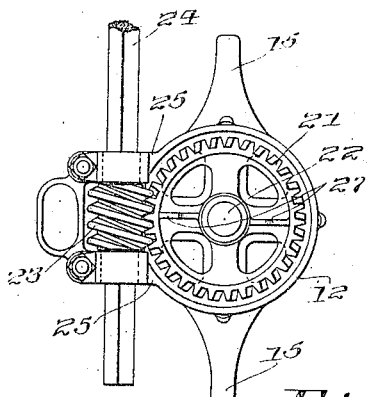
Fig. 3 shows a plan view of the supporting member, including also the driving means.
Figure 4:
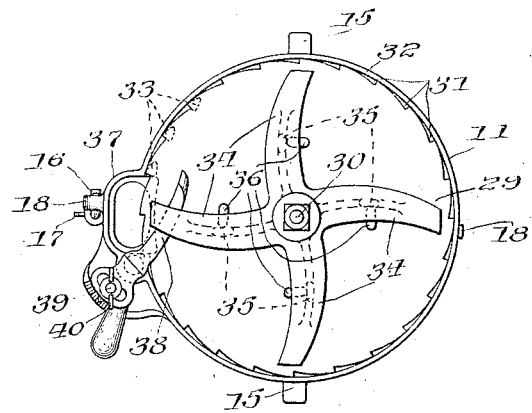
Fig. 4 shows a plan view of the base plate, including the dropper plate and associated parts.

Referring in detail to the form of my invention illustrated herewith it will be seen to comprise in a general way a hopper 10, base plate 11, and supporting member 12. The supporting member is carried rigidly upon a frame 13 of a planter.

The supporting member 12 is provided on opposite sides with outstanding lugs 15, and upon the top of the supporting member rests the base plate 11, which, however, is in no way directly secured to the supporting member. Under the base plate the hopper 10 is mounted, and the two are held together normally by means of pivot bolts 16, (two in number), arranged on opposite sides, and provided with thumb nuts 17. Each bolt it will be seen is pivoted to an ear 18 on the base plate, and coacts with a bifurcated lug 19 upon the hopper, the thumb nuts being provided to retain the parts in position. Spaced 90° from the pivot bolts upon the hopper 10 are two cam levers 20 arranged at diametrically opposite points, and in position to coact with the outstanding lugs 15 upon the supporting member. Thereby, when the base plate and hopper are arranged in position upon the supporting member, the cam levers may be turned to engage the lugs and the parts thus locked in fixed position.

The supporting member carries also the driving mechanism, which comprises a worm gear 21 rotatably mounted upon a stud 22, and a worm 23 carried in position to mesh with the worm gear. The worm is fixed upon a square driving shaft 24 journaled in bearings 25 made integral with the supporting member, said shaft deriving motion in a well known manner from the carrying wheels 26 of the planter. Upon the upper face of the worm gear 21 are two lugs 27 designed to coact with downwardly extending lugs 28 on a dropper plate 29 to thereby drive the plate. The plate 29 is carried by the base plate 11 upon a stud 30, being loosely journaled thereon. The periphery of the said plate 29, it will be seen, is provided with saw-toothed notches or serrations 31, which in operation work against the upturned rim 32 of the base plate, and act to cut the fertilizer should it adhere to the walls of the hopper or base plate, the corners of the said notches being sharpened, as shown in dotted lines at 33, for this purpose. Coaxial with the dropper plate and carried also upon the stud 30 is an agitator comprising a series of radial blades 34 spaced a slight distance above the dropper plate, and provided with downwardly extending flanges 35 which engage with the dropper plate through the agency of lugs 36, and are driven thereby. At one side of the base plate and overlapping the notched periphery of the dropper plate is a discharge spout 37 having an opening therein of comparatively large dimensions, and adjacent to the discharge spout is pivoted a feed regulating arm 38 which projects inwardly and engages the upper face of the dropper plate, being made adjustable, through a slotted connection with the pin 39 and a thumb nut 40, to vary the quantity of fertilizer admitted to the discharge opening.

In operation the radial blades 34 and flanges 35 will force the fertilizer from the center of the hopper outwardly to the periphery of the dropper plate, where the serrations will assist in carrying it along to the discharge spout 37, the pivoted arm 38 acting as an ejector to insure the discharge of the material. It is obvious that the fertilizer will be kept in a constant state of agitation, thereby preventing an agglomeration, and it therefore follows that the mass will always be in a fit state to be readily and evenly discharged from the hopper. The worm gear drive, obviously, will impart an exceedingly low speed to the dropper plate and agitator, and therefore I am enabled to adjust the ejector arm 38 to position for maintaining a wide entrance to the discharge opening, thereby presenting the least possible resistance to the outer passage of the fertilizer, and effectually preventing any clogging. The radial flanges 35 it will be seen are shortened for the purpose of permitting a wide adjustment of the ejector arm, whereas the radial blades 34 project above the said ejector and will not, of course, interfere with the adjustment thereof.

The hopper 10 is of a cylindrical construction, and has provided a cover 41 detachably connected thereon. When it is desired to fill the hopper it is only necessary for the operator to manipulate the cam levers 20 to dissengage the lugs 15, whereupon the hopper and base plate may be removed entirely from the supporting member, set upon the ground, and conveniently filled. Should the fertilizer dropping mechanism at any time become clogged the operator has simply to remove the hopper and base plate, as before stated, invert them, and by a quick manipulation of the thumb nuts 17 detach the base plate from the hopper, whereupon all operative parts of the dropping mechanism will be readily accessible for cleaning purposes, and at the same time the fertilizer will be allowed to remain intact within the inverted hopper.

The importance of these quick detachable features cannot be overrated, for their ease of operation will almost insure a thorough cleaning of all parts of the dropper by the operator each time when the planting is finished. With a hinged hopper and other permanently connected parts it is not possible to dump the fertilizer back in its place of storage, and rather than waste the material, operators heretofore have permitted it to remain in the hopper for long periods of time with disastrous results. Manufacturers of these devices have tried to overcome this defect by an attempt at making the hopper moisture proof so that fertilizer when allowed to stand within would not become dampened and caked, but obviously this is impossible as some moisture is bound to be absorbed through the dropper plate and discharge spout. The principle of making all parts easily detachable so that the operator can remove the hopper and quickly dump the fertilizer back in its place of storage is believed to be the correct solution of these problems.

While I have shown and described but one form of device herein it is to be understood, nevertheless, that it is susceptible of modification, the specific form of connecting means being capable of a wide variance. Therefore, many changes may be resorted to in the minor details of construction and arrangement without departing from the spirit of my invention as disclosed in the appended claims.

What I claim as new and desire to secure by Letters Patent of the United States is:

1. A fertilizer dropper comprising a hopper and base portion detachably secured together, a supporting member therefor, and cam levers and lugs for securing said hopper and base portion in position on the supporting member.

2. A fertilizer dropper comprising a hopper and a base portion detachably connected, said base portion carrying dropping and agitating devices, a supporting member for the hopper and base portion detachably connected to the hopper, and driving mechanism for the dropping and agitating devices carried on the supporting member.

3. In a fertilizer dropper, a rotatable feed plate, a discharge spout at one side thereof, an ejector arm for said discharge spout projecting across said plate, and an agitator arranged coaxially with said plate and driven thereby, having depending radially disposed flanges thereon.

4. In a fertilizer dropper, a rotatable plate provided with peripheral serrations, a discharge spout at one side of the plate, an ejector coöperating with the discharge spout, and agitating devices operated by said plate and feeding material toward the periphery thereof.

5. In a fertilizer dropper, a rotatable fertilizer supporting plate, an agitator coaxial therewith, and comprising radial arms provided with downwardly extending material feeding flanges, and contact lugs on said plate for actuating the agitator.

6. In a fertilizer dropper, a rotatable plate, a discharge spout at one side thereof, an ejector arm to coact with said discharge spout and lying across the plate, an agitator coaxial with the said plate and comprising radial blades projecting over the said ejector arm, and provided with downwardly extending flanges of shorter length, said flanges being in engagement with the plate and driven thereby.

7. In a fertilizer dropper, a coaxially disposed agitating and dropping mechanism comprising a rotatable fertilizer supporting plate and a radial feeding agitator, lugs on said plate to engage with and actuate said agitator, a worm drive for said plate, said worm drive comprising a worm gear having lugs thereon to engage and actuate said plate, and an endless screw for driving said worm gear.

8. A fertilizer dropper comprising a hopper, a base plate and a supporting member therefor, means for detachably securing the hopper to the base plate, and means for detachably securing the hopper to the supporting member.

In testimony whereof I affix my signature, in the presence of two witnesses.

RALPH L. FORD.

Witnesses:
EVAN EVANS,
ELMER HUGHES.

Copies of this patent may be obtained for five cents each, by addressing the "Commissioner of Patents. Washington, D. C."